(12) United States Patent
Sugimoto et al.

(10) Patent No.: US 9,988,959 B2
(45) Date of Patent: Jun. 5, 2018

(54) EXHAUST PURIFYING APPARATUS

(71) Applicant: TOYOTA JIDOSHA KABUSHIKI KAISHA, Toyota-shi, Aichi-ken (JP)

(72) Inventors: Kazuhiro Sugimoto, Susono (JP); Akira Mizuno, Nagoya (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 149 days.

(21) Appl. No.: 15/146,950

(22) Filed: May 5, 2016

(65) Prior Publication Data

US 2016/0341086 A1 Nov. 24, 2016

(30) Foreign Application Priority Data

May 22, 2015 (JP) .................................. 2015-104907

(51) Int. Cl.
*B03C 3/00* (2006.01)
*F01N 3/01* (2006.01)

(52) U.S. Cl.
CPC ............ *F01N 3/01* (2013.01); *F01N 2240/04* (2013.01); *F01N 2240/20* (2013.01); *F01N 2290/06* (2013.01); *Y02T 10/20* (2013.01)

(58) Field of Classification Search
None
See application file for complete search history.

(56) References Cited

U.S. PATENT DOCUMENTS

| 3,440,800 | A | * | 4/1969 | Messen-Jaschin | ........ | B03C 3/00 55/317 |
| 3,693,328 | A | * | 9/1972 | Paucha | .................. | B01D 45/16 55/436 |
| 4,505,723 | A | * | 3/1985 | Zahedi | ...................... | B03C 3/10 361/230 |
| 6,517,786 | B1 | * | 2/2003 | Best | ...................... | B01D 53/32 204/164 |

(Continued)

FOREIGN PATENT DOCUMENTS

JP 2005-313066 A 11/2005
JP 2006-151377 A 6/2006
(Continued)

*Primary Examiner* — Amber R Orlando
(74) *Attorney, Agent, or Firm* — Hunton Andrews Kurth LLP

(57) ABSTRACT

Particulate matter in exhaust is treated with a novel configuration. An exhaust purifying apparatus of the present invention includes a flow generating device and a treatment device. The flow generating device includes a discharge electrode arranged inside of a tubular outer shell forming a flow passage in which exhaust containing the particulate matter flows. The discharge electrode is configured to generate the flow of the particulate matter from the discharge electrode side to the outer shell side by voltage application. The treatment device includes a space defining member and a treatment electrode. The space defining member is arranged between the discharge electrode and the outer shell to define a treatment space between the outer shell and the space defining member, and is configured to allow the inflow of the particulate matter into the space. Upon treating the particulate matter, the voltage application is performed to the treatment electrode.

18 Claims, 14 Drawing Sheets

(56) References Cited

U.S. PATENT DOCUMENTS

| | | | | |
|---|---|---|---|---|
| 6,869,467 B2 * | 3/2005 | Scheuch | ................. | B03C 3/155 55/DIG. 38 |
| 7,582,145 B2 * | 9/2009 | Krigmont | ............... | B03C 3/025 55/DIG. 38 |
| 7,597,750 B1 * | 10/2009 | Krigmont | ............... | B03C 3/014 55/DIG. 38 |
| 9,073,062 B2 * | 7/2015 | Dunn | ........................ | B03C 3/47 |
| 9,770,685 B2 * | 9/2017 | Krueger | ................ | B01D 46/02 |
| 2002/0134237 A1 * | 9/2002 | Miller | ....................... | B03C 3/09 95/63 |
| 2007/0245898 A1 | 10/2007 | Naito et al. | | |

FOREIGN PATENT DOCUMENTS

| | | | |
|---|---|---|---|
| JP | 2007-021380 A | | 2/2007 |
| JP | 2007-284536 A | | 11/2007 |
| JP | 2007-284961 A | | 11/2007 |
| JP | 2008-019853 A | | 1/2008 |
| JP | 2009-112916 A | | 5/2009 |
| JP | 2009127442 A | * | 6/2009 |
| JP | 2010-069360 A | | 4/2010 |
| JP | 2012-170869 A | | 9/2012 |

\* cited by examiner

EXHAUST PURIFYING APPARATUS

CROSS-REFERENCES TO RELATED APPLICATIONS

This application claims the benefit of Japanese Patent Application No. 2015-104907, filed May 22, 2015, which is hereby incorporated by reference wherein in its entirety.

BACKGROUND OF THE INVENTION

Field of the Invention

The present invention relates to an exhaust purifying apparatus that treats particulate matter in a passage in which a gas containing the particulate matter flows.

Description of the Related Art

Japanese Patent Laid-Open No. 2009-112916 discloses an example of an exhaust purifying apparatus for treating particulate matter (PM) contained in factory gases or in exhaust in automobiles, machines (including internal combustion engines) and the like. The exhaust purifying apparatus disclosed in Japanese Patent Laid-Open No. 2009-112916 includes an outer shell shaped in a tubular form, a dust trapping filter device composed of a dust trapping electrode arranged along an inner side of the outer shell and a dust trapping filter layer, and a discharge electrode disposed inside of the dust trapping filter device and arranged in the central part of a flow passage for exhaust containing the particulate matter. The discharge electrode includes a primary portion extending along the center axis of the outer shell and a plurality of projecting portions each projecting in a direction perpendicular to the center axis of the outer shell from the primary portion. The dust trapping electrode is conductive and is earthed through the outer shell. According to the description of Japanese Patent Laid-Open No. 2009-112916, a high voltage is applied to the discharge electrode to generate corona discharge on the circumference of the projecting portion of the discharge electrode, and the particulate matter in the exhaust takes charge with the corona discharge. The charged particulate matter can flow toward the dust trapping electrode as an opposing electrode by coulomb forces. As a result, an ion wind is formed in a direction perpendicular to the flow direction of the exhaust and the particulate matter is trapped in the dust trapping filter device. It should be noted that in an embodiment of Japanese Patent Laid-Open No. 2009-112916, the dust trapping filter device is formed in a bellows shape, thereby increasing a surface area of the dust trapping electrode to enhance a trapping rate of the particulate matter.

SUMMARY OF THE INVENTION

According to the exhaust purifying apparatus in the description of Japanese Patent Laid-Open No. 2009-112916, when a trapping amount of the particulate matter in the exhaust reaches a certain degree or more, it is necessary to remove the particulate matter trapped in the dust trapping filter device outside of the outer shell. However, it takes a lot of trouble to mechanically remove the particulate matter trapped in the dust trapping filter device outside of the outer shell, and therefore it is desirable to treat the particulate matter within the outer shell.

The present invention has an object of providing an exhaust purifying apparatus that can treat particulate matter within an outer shell.

The present inventors have found out that the particulate matter can be treated within the outer shell by arranging electrodes within the outer shell and applying a voltage thereto, and have reached completion of the present invention.

According to an aspect of the present invention, there is provided an exhaust purifying apparatus comprising: a flow generating device that includes a discharge electrode arranged inside of a tubular outer shell forming a flow passage in which exhaust containing particulate matter flows and is configured to generate flow of the particulate matter from the discharge electrode side to the outer shell side with voltage application to the discharge electrode; and a treatment device that includes a space defining member that is arranged between the discharge electrode and the outer shell to define a treatment space between the outer shell and the space defining member and is configured to allow inflow of the particulate matter into the treatment space, and a treatment electrode arranged in the treatment space, wherein voltage application is performed to the treatment electrode upon treating the particulate matter.

Preferably at least a part of the outer shell and the space defining member is conductive, and the flow generating device is configured to generate a potential difference between the discharge electrode and at least one of the outer shell and the space defining member by the voltage application.

Preferably at least a part of the outer shell is conductive, and the treatment device is configured to generate a potential difference between the treatment electrode and the outer shell by the voltage application.

Preferably the treatment device performs the voltage application of a first voltage upon prompting the inflow of the particulate matter into the space, and performs the voltage application of a second voltage higher than the first voltage upon treating the particulate matter.

Preferably the space defining member is provided to close a gap between the outer shell and the space defining member at an upstream end thereof in a flow direction of the exhaust, and includes a plurality of holes, each of the holes communicating the flow passage with the treatment space.

Preferably the space defining member includes a plurality of holes, each of the holes communicating the flow passage with the treatment space, wherein an opening cross-section area of the hole closer to the discharge electrode is larger than an opening cross-section area of the hole closer to the outer shell.

Preferably the exhaust purifying apparatus further comprises a cooling device that is configured to cool the treatment space.

Preferably the treatment device further includes an outflow restraining member for restraining the particulate matter from flowing out outside of the treatment space upon treating the particulate matter.

Preferably the space defining member includes a plurality of holes, each of the holes communicating the flow passage with the treatment space, and the outflow restraining member has selectively an opening state of opening the plurality of holes and a closing state of closing the plurality of holes in the space defining member.

For example, the treatment device can generate plasma in the treatment space by the voltage application, and an approximately entire region of the treatment space can be in a plasma state with an action of the treatment device.

According to the above aspect of the present invention, the particulate matter can be directed to the outer shell side for collection by the action of the flow generating device, and the treatment device can generate an oxidation promoting component or plasma in the treatment space with the voltage application to the treatment electrode, thereby to treat the particulate matter having reached the treatment space. Further, the space defining member separates the treatment space of the particulate matter from the flow passage of the exhaust, thus making it possible to adjust a treatment environment of the particulate matter by the treatment device. Therefore, according to the above aspect of the present invention, the excellent effect that the particulate matter can be appropriately treated within the outer shell can be accomplished.

Further features of the present invention will become apparent from the following description of exemplary embodiments (with reference to the attached drawings).

BRIEF DESCRIPTION OF THE DRAWINGS

FIG. 12A is a sectional schematic diagram of an exhaust purifying apparatus according to a third embodiment of the present invention, wherein FIG. 12A illustrates an opening state of opening portions;

FIG. 12B is a sectional schematic diagram of an exhaust purifying apparatus according to a third embodiment of the present invention, wherein FIG. 12B illustrates a closing state of the opening portions;

FIG. 14A is a schematic diagram illustrating a modification of an outflow restraining member in the exhaust purifying apparatus according to the third embodiment and corresponding to IV region in FIG. 1, wherein FIG. 14A illustrates an opening state of opening portions; and FIG. 14B is a schematic diagram illustrating a modification of an outflow restraining member in the exhaust purifying apparatus according to the third embodiment and corresponding to IV region in FIG. 1, wherein FIG. 14B illustrates a closing state of the opening portions.

DESCRIPTION OF THE EMBODIMENTS

Hereinafter, an explanation will be made of embodiments of the present invention with reference to the accompanying drawings.

Figure 1:
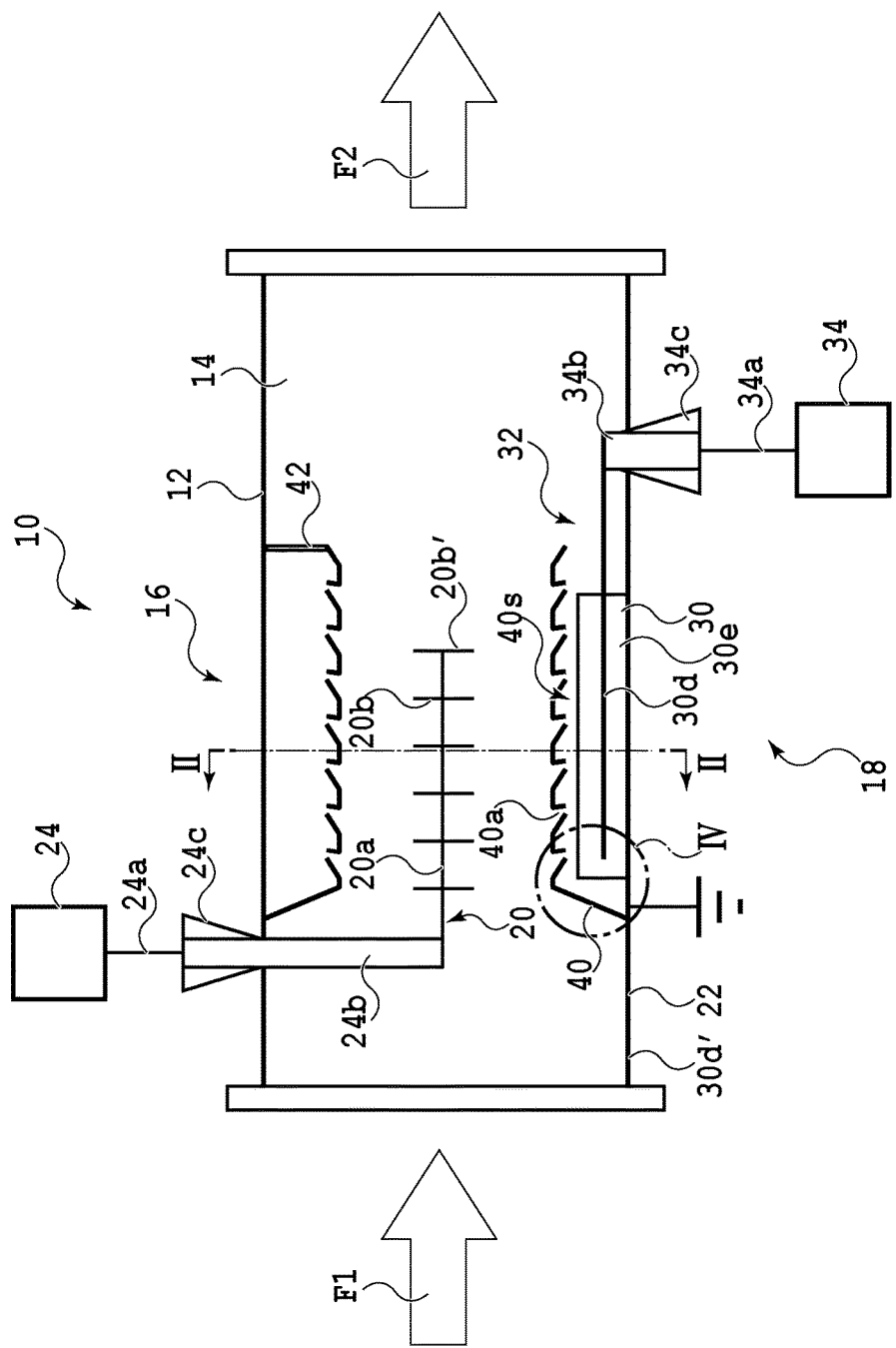
FIG. 1 is a schematic configuration diagram illustrating an exhaust purifying apparatus according to a first embodiment of the present invention, and a sectional schematic diagram taken along lines I-I in FIG. 2.

First, an explanation will be made of an exhaust purifying apparatus 10 according to a first embodiment of the present invention. FIG. 1 is a schematic cross section illustrating the exhaust purifying apparatus 10 according to the first embodiment of the present invention. The exhaust purifying apparatus 10 is applied to the exhaust treatment in a factory facility. The left side in FIG. 1 is the upstream side in the flow direction of exhaust, and the right side in FIG. 1 is the downstream side in the flow direction of exhaust. The flow of the exhaust is expressed by arrows F1 and F2 in FIG. 1.

In FIG. 1, the exhaust purifying apparatus 10 is applied to an exhaust passage 14 as a flow passage that is defined and formed by a tubular outer shell 12 and in which exhaust flows. The exhaust can contain particulate matter (hereinafter, refer to PM). The exhaust purifying apparatus 10 is provided with a flow generating device 16 and a treatment device 18.

The flow generating device 16 is disposed to trap PM from the exhaust, and therefore may be called a trapping device. The flow generating device 16 is provided with a discharge electrode 20. The discharge electrode 20 herein includes a primary portion 20a arranged to extend along the longitudinal direction of the exhaust passage 14, and a plurality of discharge projecting portions 20b, each projecting to extend radially (direction perpendicular to the longitudinal direction of the exhaust passage) from the primary portion 20a. The plurality of discharge projecting portions 20b are, as illustrated in FIG. 1, disposed to be spaced by substantially constant intervals along the axis direction of the primary portion 20a from the upstream side to the downstream side in the flow direction of the exhaust. The plurality of projecting portions 20b (herein, four portions) are disposed in the same position along the axis direction of the primary portion 20a, and are disposed to be spaced by substantially equal intervals (herein, interval of approximately 90°). It should be noted that the number of the projecting portions 20b in the same position along the axis direction of the primary portion 20a may be one, two, three, five or more.

The flow generating device 16 includes the outer shell 12 as an electrode 22 paired with the discharge electrode 20, herein as an exhaust tube. The outer shell 12 is conductive, and carries out a function of the electrode 22. Here, the entirety of the outer shell 12 is conductive, and can act as the electrode 22. However, only a part of the outer shell 12 may be conductive. At least a part of the outer shell 12 is preferably conductive, and the conductive section is preferably disposed in a position where a tip end of the projecting portion 20b of the discharge electrode 20 is directed or in a position downstream of the above position in the exhaust direction. It should be noted that in a case where only a part of the outer shell 12 is made to be conductive as the electrode 22, a section of the outer shell 12 corresponding to the electrode 22 is preferably positioned in at least a downward section of the outer shell 12 in the vertical direction.

The flow generating device 16 further includes a first voltage generating device 24 for applying a voltage between the discharge electrode 20 and the outer shell 12. The first voltage generating device 24 is herein configured to generate a DC voltage. It should be noted that a magnitude of the voltage is defined by experiments. For example, the voltage by the first voltage generating device 24 is set for charging PM in the exhaust to be negative, and the magnitude is preferably 7.5 kV or more (that is, preferably −7.5 kV or less). However, the present invention is not limited to this range.

The first voltage generating device 24 is connected on one hand to the discharge electrode 20 through a conductive wire 24a and an insulator 24b, and is earthed on the other hand (not illustrated). It should be noted that in FIG. 1, the insulator 24b is fixed to the outer shell 12 by a silicone plug 24c. However, the insulator 24b may be fixed by various insulating members other than the silicone plug 24c. In addition, the insulator 24b is made of ceramic or glass, and may be formed of various insulators.

On one hand, the first voltage generating device 24 is earthed, and on the other hand, the outer shell 12 is also earthed. Therefore a potential difference can be securely generated between the discharge electrode 20 and the outer shell 12 with high voltage application by the first voltage generating device 24. It should be noted that the electrode 22 may be disposed between the discharge electrode 20 and the outer shell 12 (to be in contact with the inner surface of the outer shell 12 or to be away from the outer shell 12). In this case, one connecting portion of the first voltage generating device 24 may be connected to the electrode 22 or may be earthed as described above.

The treatment device 18 is configured such that the PM having reached the treatment device 18 can be treated. Here, the treatment device 18 is disposed along the inner surface of the outer shell 12 over the entire circumference. The treatment device 18 is disposed to cover at least a region where the plurality of projecting portions 20b as mentioned above are arranged, in a direction along the longitudinal direction of the exhaust passage 14. Here, the treatment device 18 is disposed over a substantially entire section where the tip ends of the projecting portions 20b of the discharge electrode 20 are directed. It should be noted that the PM reaching the treatment device 18 is possibly inclined to flow in the downstream side due to an influence of the flow of the exhaust, and therefore the treatment device 18 preferably extends to the further downstream side than a projecting portion 20b' in the most downstream side.

The treatment device 18 includes a plurality of discharge members 30 arranged in the outer shell 12 and a space defining member 40 arranged between the discharge members 30 and the discharge electrode 20. The plurality of discharge members 30 are arranged not to overlap with each other along an inner peripheral surface of the outer shell 12. The space defining member 40 is arranged to extend between the discharge members 30 arranged inside of the outer shell 12 and the discharge electrode 20.

First, an explanation will be made of a PM treatment mechanism having the discharge members 30, that is, a PM treatment unit 32. The PM treatment unit 32 is made up of the discharge members 30 arranged in the outer shell 12 and the outer shell 12.

Each of the discharge members 30 is elongated and substantially circular in section, and in the present embodiment, is arranged and configured to extend approximately straight (in parallel with the axis direction of the primary portion 20a). The discharge member 30 may vary in size, and the sectional diameter may be in a range from several nm to several cm. The discharge member 30 includes a center electrode 30d as a first electrode (treatment electrode) and a dielectric body for covering the center electrode 30d. The center electrode 30d is a conductive wire member extending along the center axis of the discharge member 30, and is connected to a second voltage generating device 34 provided separately from the first voltage generating device 24. The dielectric body 30e is herein made of ceramic, and acts as an insulator without application of a voltage to be described later. The discharge member 30 is arranged such that the axis direction of the center electrode 30d is approximately in parallel with the longitudinal direction (that is, the axis direction of the primary portion 20a). It should be noted that the arrangement position of the discharge member 30 is preferably extended to the further downstream side than the projecting portion 20b' of the discharge electrode 20 positioned in the most downstream side.

Figure 2:
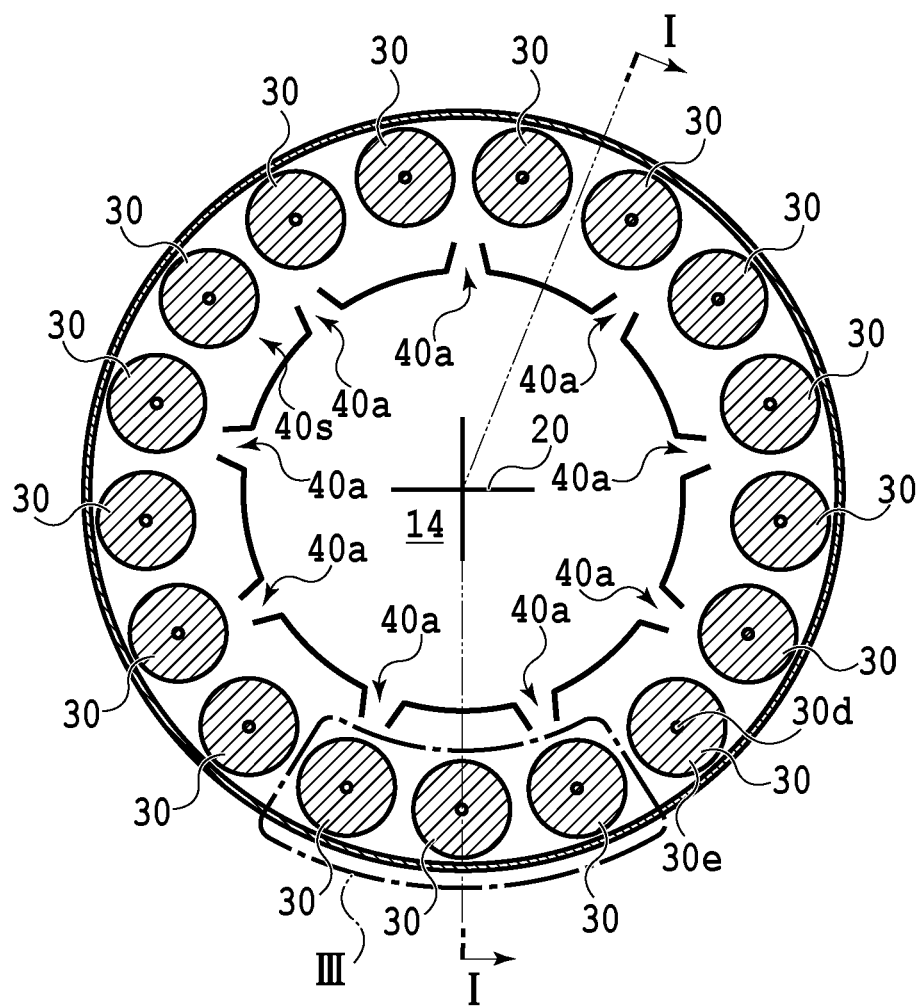
FIG. 2 is a sectional schematic diagram taken along lines II-II in FIG. 1, illustrating the exhaust purifying apparatus in FIG. 1.
Figure 3:
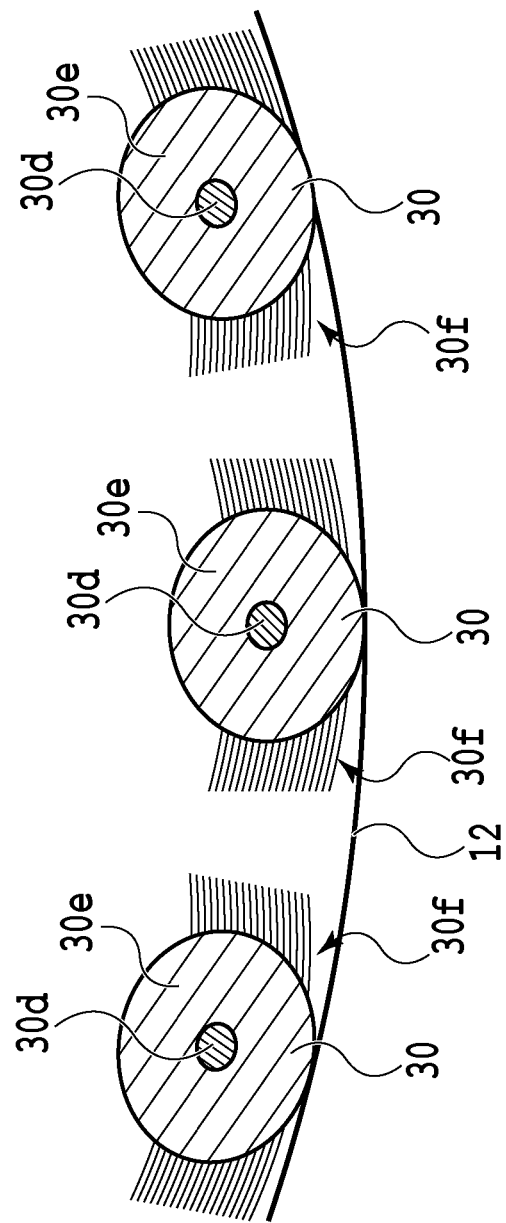
FIG. 3 is a schematic diagram illustrating III region in FIG. 2 in a treatment device in the exhaust purifying apparatus in FIG. 1.

Here, FIG. 3 illustrates a sectional schematic diagram of the discharge members 30 adjacent to each other in the treatment device 18. FIG. 3 is a sectional schematic diagram of a region surrounded in III line in FIG. 2, and includes cross sections of the three discharge members 30.

The discharge member 30 further includes a fibrous body 30f outside of the dielectric body 30e in addition to the center electrode 30d and the dielectric body 30e. The fibrous body 30f is configured of a plurality of fibers, and each of the fibers is made of ceramic whisker, herein Si whisker, but may be made of the other material. The fibrous body 30f has a water component retaining function, and can act as a water component retaining function unit. In addition, the fibrous body 30f has a PM trapping function for trapping the PM having reached thereto, and can act as a PM trapping function unit. It should be noted that the fibrous body 30f can be formed using various fibers as a material, but is formed of a material tolerable to temperatures and gas components of exhaust possibly flowing in the outer shell 12. This is true of the other components of the discharge member 30 and the above discharge electrode 20.

The fibrous body 30f can be directed and mounted to the surface (outer surface) of the dielectric body 30e having the center electrode 30d using a so-called electrostatic flocking device. Not illustrated, but fibers that will adhere to a target object (that is, dielectric body 30e) are placed on an electrode plate, and a high voltage is applied between the target object and the electrode plate. Thereby the fibers fly and rise by the electrostatic gradient force to be made to adhere on the target object coated with an adhesive. As a result, the fibers can adhere onto the surface of the dielectric body 30e, maintaining a certain degree of directionality to form the fibrous body 30f. It should be noted that FIG. 3 schematically illustrates a state where the fibrous body 30f is disposed with a certain degree of directionality. The fibrous body 30f may be disposed by another method, and for example, there may be adopted a method for burying one or more of fibers in predetermined positions by hands or mechanically.

The discharge member 30 having the above configuration is arranged such that the dielectric body 30e has contact with the inner surface of the outer shell 12. The outer shell 12 is conductive as described above, and acts as a second electrode 30d' of the treatment device 18 (paired to the first electrode). In this manner, the outer shell 12 as the second electrode 30d' of the treatment device 18 is arranged to the center electrode 30d as the first electrode through the dielectric body 30e. In this manner, in the present embodiment, the outer shell 12 is the electrode 22 of the flow generating device 16, as well as the second electrode 30d' of the treatment device 18. However, the electrode 22 of the flow generating device 16 and the second electrode 30d' of the treatment device 18 may be provided independently with each other.

The treatment device 18 has a second voltage generating device 34. As illustrated in FIG. 1, the second voltage generating device 34 is connected to the center electrode 30d through a conductive wire 34a and an insulator 34b. Particularly, here, the second voltage generating device 34 is connected to the center electrodes 30d of all the discharge members 30. It should be noted that, for example, when the plurality of discharge members 30 are connected to each other to be formed as one discharge member 30, the second voltage generating device 34 is preferably connected to only one center electrode 30d of one discharge member 30. It should be noted that in FIG. 1, the insulator 34b is fixed to the outer shell 12 by a silicone plug 34c. However, the insulator 34b may be fixed by various insulating members other than the silicone plug. The insulator 34b is made of ceramic or glass, and may be formed of various insulators.

The second voltage generating device 34 is here configured to generate an AC voltage. A magnitude of the voltage is defined by experiments. For example, in a case of the AC voltage, the voltage by the second voltage generating device 34 may be approximately 12 kV and the frequency is 1 kHz, but the present invention is not limited to this range. The second voltage generated by the second voltage generating device 34 is not limited to the above AC voltage, and may be an alternation voltage that polarity of a voltage of a pulse or the like is reversed. The second voltage generating device 34 may generate a DC voltage depending upon the configuration of the discharge member 30, and, for example, may be a pulse DC voltage.

On one hand, the second voltage generating device 34 is thus connected to the center electrode 30d of the discharge member 30, and on the other hand, is earthed (not illustrated). In addition, the outer shell 12 is also earthed. Therefore it is possible to generate a potential difference between the center electrode 30d of the discharge member 30 and the outer shell 12 with high voltage application by the second voltage generating device 34. It should be noted that a second electrode may be disposed between the dielectric body 30e of the discharge member 30 and the outer shell 12 (to be in contact with the inner surface of the outer shell 12 or to be away from the outer shell 12). In this case, one connecting portion of the second voltage generating device 34 may be connected to the second electrode or may be earthed as described above.

The space defining member 40 is arranged to extend between the discharge member 30 (that is, the center electrode 30d as the treatment electrode) and the discharge electrode 20. The space defining member 40 is disposed in the exhaust passage 14 to substantially separate a space 40s for treatment (treatment space) of PM, where the discharge member 30 is arranged, from the exhaust passage 14. Hereinafter, a region in the outer shell 12 other than the space 40s may be called the exhaust passage 14, but the present invention does not exclude that the space 40s is defined as a part of the exhaust passage 14. The space defining member 40 is fixed in the outer shell 12 by a support member 42. In FIG. 1, only one of the support member 42 is illustrated, but the number of the support members 42 may have any number, and the support member 42 may have any configuration.

The space defining member 40 is a substantially cylindrical member, and has a plurality of holes (opening portions) 40a. Each of the holes 40a establishes communication of the exhaust passage 14 and the space 40s to each other. The plurality of holes 40a is arranged in parallel to each other in the longitudinal direction of the exhaust passage 114, and in the circumferential direction around the exhaust passage 14. Each of the holes 40a may extend in the longitudinal direction of the exhaust passage 14 in an elongated manner to be not arranged in parallel in the longitudinal direction of the exhaust passage 14 or may extend long in the circumferential direction of the exhaust passage 14 to be not arranged in parallel in the circumferential direction of the exhaust passage 14.

Figure 4:
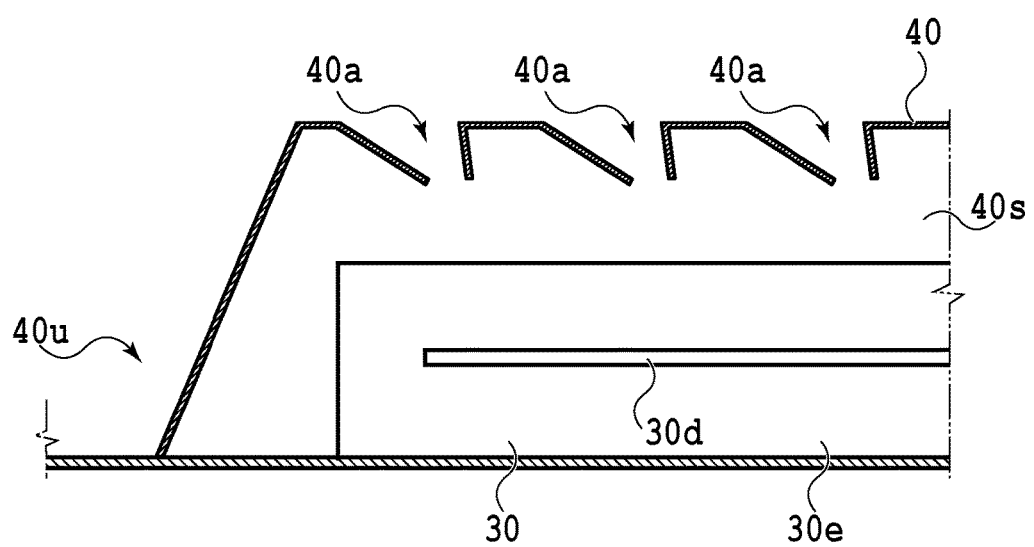
FIG. 4 is a schematic diagram illustrating IV region in FIG. 1 in the treatment device in the exhaust purifying apparatus in FIG. 1.

Each of the holes 40a is configured to allow inflow of PM from the exhaust passage 14 into the space 40s. Further, each of the holes 40a is configured to restrain outflow of PM to the exhaust passage 14 from the space 40s through each of the holes 40a. Specifically each of the holes 40a is formed such that an opening cross-section area of the hole 40a closer to the space 40s (that is, farther toward the outer shell 12 from the discharge electrode 20) is the smaller. That is, in each of the holes 40a, the opening cross-section area of the hole 40a closer to the discharge electrode 20 is larger than the opening cross-section area of the hole 40a closer to the outer shell 12. Such a shape of the hole 40a is illustrated in FIGS. 2 and 4. In the sectional schematic diagram in FIG. 2 in a direction perpendicular to the longitudinal direction of the exhaust passage 14, the hole 40a is formed to be the narrower as it is closer to the outer shell 12. In the sectional schematic diagram in FIG. 4 in a direction in parallel to the longitudinal direction of the exhaust passage 14, the hole 40a is formed to be the narrower as it is closer to the outer shell 12, and is formed to be inclined to be positioned closer to the downstream side in the flow direction of the exhaust as it is closer to the outer shell 12 in consideration of the smooth flow of the PM into the space 40s along the flow of the exhaust. In this way, the opening cross-section area of the hole 40a closer to the discharge electrode 20 is larger than the opening cross-section area of the hole 40a closer to the outer shell 12, and is formed to inclined to be closer to the direction in parallel to the flow of the PM riding the flow of the exhaust. However, for example, a modification that the opening cross-section area of the hole 40a closer to the discharge electrode 20 is smaller than the opening cross-section area of the hole 40a closer to the outer shell 12 or these cross-section areas are equal is possible.

A distance of the space defining member 40 from the outer shell 12 is defined such that the PM is oxidized (burned) for treatment in the space 40s with voltage application to the center electrode 30d of the discharge member 30. The space defining member 40 is arranged closer to the discharge member 30 than the discharge electrode 20 such that the PM can be treated in an approximately entire region of the space 40s by a discharge phenomenon (including a generation phenomenon of oxidation accelerating components and plasma state generation to be described later) in the discharge member 30 by the voltage application. It should be noted that the arrangement position of the space defining member 40 is preferably designed in consideration of a size of the discharge member 30, an application voltage by the second voltage generating device 34, a size of the outer shell 12 and the like.

The space defining member 40 is connected directly to the outer shell 12 to close a gap between the outer shell 12 and the space defining member 40 at an upstream end 40u of the space defining member 40 in the flow direction of the exhaust Therefore the upstream end of the space 40s becomes in a closing state. On the other hand, the space defining member 40 does not close a gap between the outer shell 12 and the space defining member 40 on the downstream side in the flow direction of the exhaust, and therefore the space 40s opens to the flow passage of the exhaust, that is, the exhaust passage 14. However, this configuration does not mean to exclude the configuration that the space 40s may close at the downstream, end.

Hereinafter, an explanation will be made of an operation of the exhaust purifying apparatus 10 having the above configuration.

When exhaust containing PM flows in the exhaust passage 14 in the outer shell 12, the high voltage is applied to the discharge electrode 20 from the first voltage generating device 24 in the flow generating device 16. Therefore ions spread out toward the outer shell 12 (or the conductive space defining member 40) from the discharge electrode 20, preferably the projecting portion 20b, thus causing the PM to be charged to be negative. An ion wind (not illustrated) induced by the ions is generated to generate the flow from the discharge electrode 20-side to the outer shell 12-side. As a result, the flow of the PM to the outer shell 12-side is generated to cause a large part of the PM contained in the exhaust to be introduced to the radial outer periphery in the exhaust passage 14, that is, to the outer shell 12-side. It should be noted that this principle is as indicated in Japanese Patent Laid-Open No. 2009-1112916.

The space defining member 40 is connected directly to the outer shell 12 to close the gap between the outer shell 12 and the space defining member 40 at the upstream end 40u, and does not close the gap between the outer shell 12 and the space defining member 40 on the downstream side in the flow direction of the exhaust and the space 40s opens to the exhaust passage 14. Therefore, in general, the space 40s is lower in pressure than the exhaust passage 14 as a whole. As a result, the PM is likely to easily flow into the space 40s through the holes 40a.

The PM directed to the outer shell 12 from the discharge electrode 20-side in this manner can reach the space 40s through the holes 40a of the space defining member 40. The PM having reached the space 40s can reach the circumference of the discharge member 30. Therefore a part of the PM can be trapped or retained by the above fibrous body 30f.

Figure 5A:
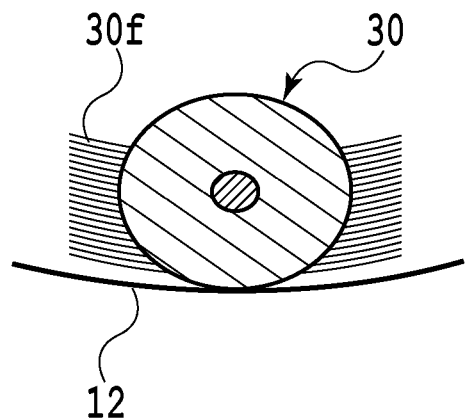
FIG. 5A is a sectional schematic diagram illustrating one discharge member in FIG. 3 and the circumference of the discharge member.
Figure 5B:
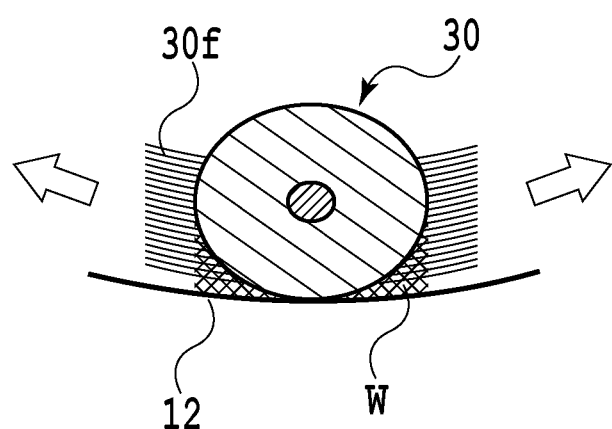
FIG. 5B is a diagram schematically illustrating a state where water components are retained on the circumference of the discharge member.

On the other hand, water components (due to combustion of fuel) can be contained in the exhaust. The water components can be retained on the fibrous body 30f by a capillary action to spread out on the surface of the dielectric body 30e. Here, FIGS. 5A and 5B illustrating one of the cross sections of the three discharge members 30 in FIG. 3 are referred to. FIG. 5A schematically illustrates the one cross section relating to the discharge member 30, and FIG. 5B schematically illustrates a state where water components are present in the circumference of the discharge member 30. In FIG. 5B, a water-component existing region W is conceptually illustrated.

Here, an AC high voltage is applied to the discharge member 30 from the second voltage generating device 34 to cause a discharge phenomenon between the discharge member 30 and the outer shell 12, particularly in the vicinity of a contact portion between the dielectric body 30e and the outer shell 12. Here, as described above, since the water components exist in the circumference of the dielectric body 30e, the discharge phenomenon can be generated not only in the vicinity of the contact portion between the dielectric body 30e and the outer shell 12, but also in a wider range along the water-component existing region W. That is, the water component may bring in enlargement of the discharge region. This discharge action can generate ozone, active oxygen and the like in a wider range in the circumference of the dielectric body 30e in the outer shell 12. The ozone or active oxygen is an oxidation accelerating component for accelerating the oxidation, which prompts oxidation (including burning) of the PM. Accordingly the PM is subjected to oxidation treatment (burning treatment).

Further, ion streams are generated in this discharge, and, as schematically illustrated in arrows in FIG. 5B, the ion streams are generated in a direction away from the discharge member 30. In the present embodiment, since the fibrous body 30f is disposed in the discharge member, the flow of the ion streams is likely to be easily generated in a direction along the fibrous body 30f, and as illustrated in FIG. 5B, the ion streams are likely to be easily generated along the inner surface of the outer shell 12. There is a possibility that riding the ion stream, a part of the PM is not sufficiently oxidized, and floats in various directions away from the discharge member 30 to fly in all directions. However, as described above, the space defining member 40 is provided, therefore making it possible to restrain the PM from flying in all directions from the space 40s to the exhaust passage side. Accordingly the oxidation treatment of the PM can be appropriately executed in the space 40s.

Figure 6:
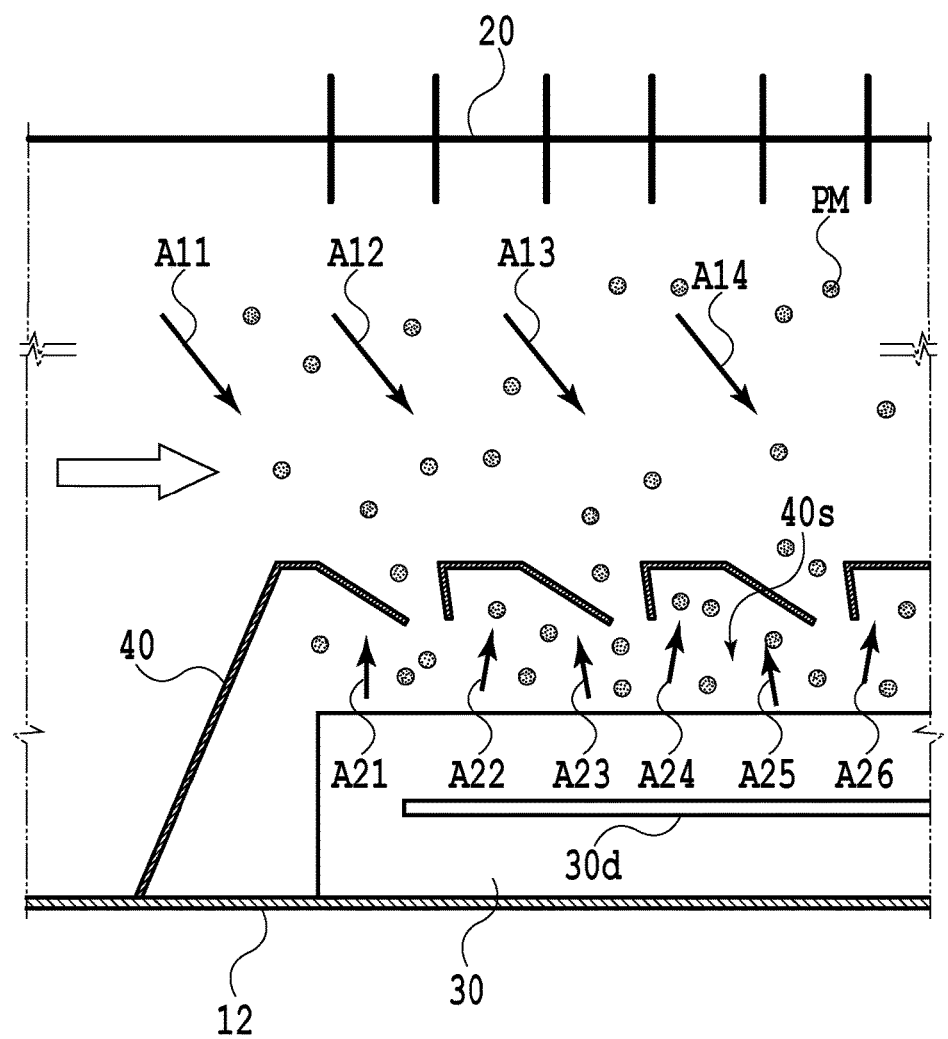
FIG. 6 is a diagram illustrating the behavior of PM in the exhaust purifying apparatus in FIG. 1.

FIG. 6 schematically illustrates the trapping of the PM into this space 40s and the treatment of the PM in the space 40s. In FIG. 6, the discharge electrode 20, the space defining member 40, the discharge member 30 and the outer shell 12 are illustrated focusing on a relative positional relation of each other. The voltage application to the discharge electrode 20 enables the flow of the PM to the outer shell 12 to be generated, thereby making it possible for the PM to reach the space 40s as described above (refer to arrows A11 to A14). In addition, the voltage application to the center electrode 30d of the discharge member 30 can treat the PM in the space 40s. Upon treating the PM, the PM can fly in all directions in the space 40s as indicated by arrows A21 to A26, but the space defining member 40 acts as a flying preventive member to cause the PM to remain in the space 40s. Therefore it is possible to more effectively treat the PM.

In the first embodiment, the operation of the first voltage generating device 24 and the operation of the second voltage generating device 34 can be performed any time. For example, the first voltage generating device 24 can be constantly performed when the exhaust flows. However, only as needed, the first voltage generating device 24 may be operated. This is true of the second voltage generating device 34.

As described above, the first embodiment of the present invention is explained, but alternations thereof are variously possible. For example, in the first embodiment, as illustrated in FIG. 3, the fibrous body 30f is disposed such that the fibers extend only in the direction substantially in parallel to the inner surface of the outer shell. 12 in a part of the circumference of the dielectric body 30e, but may be disposed over the substantially entire circumference of the dielectric body 30e surrounding the center electrode 30d to be approximately covered with. However, preferably a part of the dielectric body 30e makes direct contact with the outer shell 12 as the electrode. The fibrous body 30f is, preferably, as illustrated in FIG. 3, disposed to rise substantially vertically from the dielectric body 30e. However, for example, the fibrous body 30f does not have a predetermined directionality as non-woven fabric, and may achieve a water-component retaining function. In addition, a mesh-shaped member may be used as an alternative to the fibrous body. The mesh-shaped member may achieve the water-component retaining function, and in addition thereto or in place thereof, may orient the flow of the ion streams to a predetermined direction.

Further, in the first embodiment of the present invention, the treatment device 18 has one treatment unit 32 (including all the discharge members 30), but may be divided into two or more treatment units. That is, a discharge member on which a voltage is applied and a discharge member on which a voltage is not applied may be selectively switched, wherein the PM having flied in all directions from the discharge member on which the voltage is applied may remain in the circumference of the discharge member on which the voltage is not applied.

The exhaust purifying apparatus 10 according to the first embodiment of the present invention is applied to the exhaust purification in a factory, but may be used for exhaust purification of various automobiles, machines, tunnels and the like. Particularly the exhaust purifying apparatus 10 is preferably used for the exhaust purification for internal combustion engines. It should be noted that the alternations to the exhaust purifying apparatus 10 according to the first embodiment as described above are similarly applicable to exhaust purifying apparatuses according to the other embodiments as follows.

Next, an explanation will be made of a second embodiment of the present invention. An exhaust purifying apparatus 110 according to the second embodiment is applied to an internal combustion engine. The exhaust purifying apparatus 110 has the substantially same configuration with the exhaust purifying apparatus 10 according to the first embodiment, but is characterized in regard to voltage application by each of the first and second voltage generating devices 24, 34. Hereinafter, an explanation will be made primarily of different points of the second embodiment from the first embodiment, and components identical (or equivalent) to those already explained are referred to as the reference signs already used above. The further detailed explanation thereof is omitted.

Figure 7:
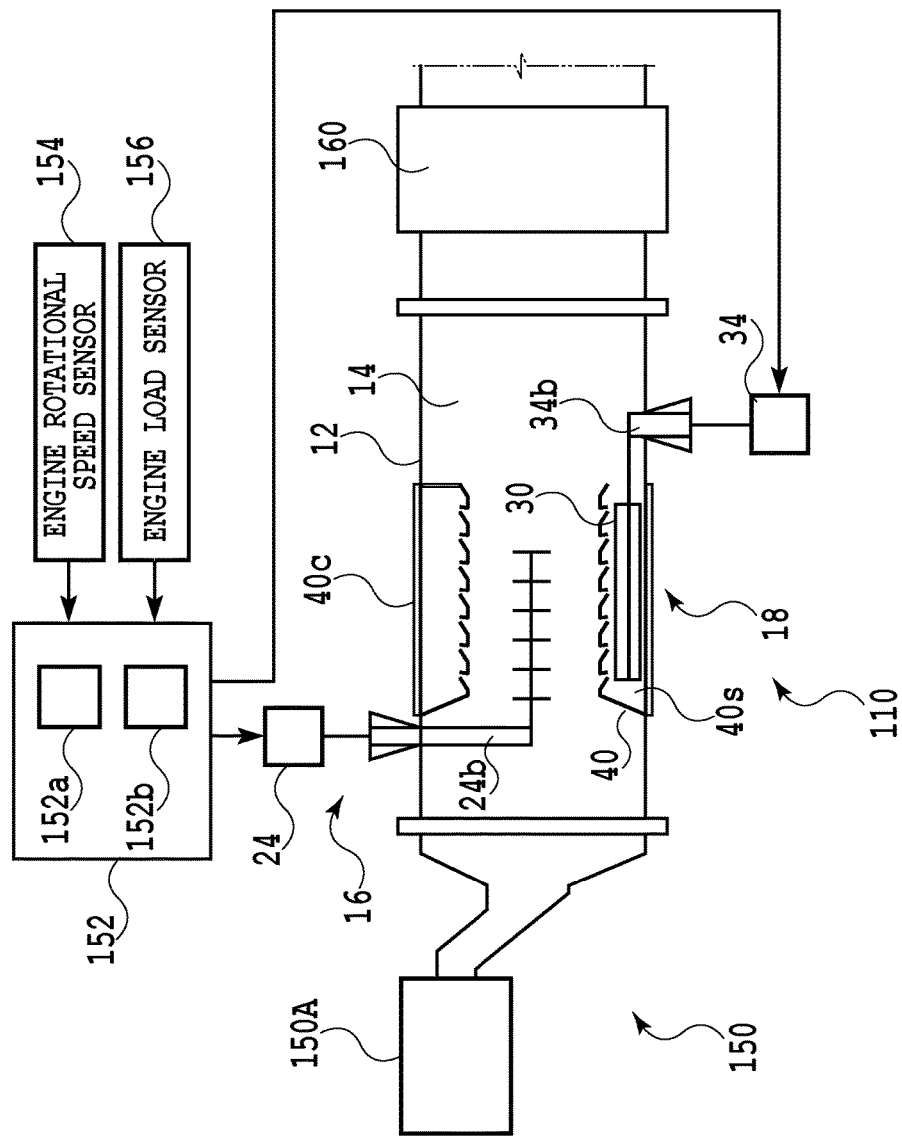
FIG. 7 is a schematic configuration diagram illustrating an exhaust purifying apparatus according to a second embodiment of the present invention, being applied to an internal combustion engine.

As illustrated in FIG. 7, the exhaust purifying apparatus 110 is applied to the exhaust passage 14 connected to a main body 150A of an internal combustion engine (hereinafter, engine) 150. The exhaust passage 14 is formed to be defined by the exhaust tube as the outer shell 12, and the exhaust tube 12 is formed of a conductive material. The engine 150 may be a spark-ignition internal combustion engine, but here, is a compression-ignition internal combustion engine (that is, diesel engine).

In the exhaust purifying apparatus 110, a cooling device 40c is disposed radially outside of the space 40s to more effectively reduce a pressure in the space 40s to be lower than a pressure in the exhaust passage 14. The cooling device 40c is configured such that cooling water to the engine 150 flows in circulation. Therefore the PM can be more appropriately introduced into the space 40s with a cooling action of the cooling device 40c.

The engine 150 has a control device 152. The control device 152 is a so-called electronic control unit (ECU) to which various sensors are connected. The control unit 152 is substantially configured of a computer including a computation processing unit (for example, CPU), a storage device (for example, ROM and RAM), an A/D converter, an input interface, an output interface and the like. Various sensors are connected electrically to the input interface. The control device 152 electrically outputs operating signals or driving signals from the output interface such that a smooth drive or operation of the engine 150 is performed according to preset programs or the like, based upon signals from the various sensors. In this manner, an operation of a fuel injection valve (not illustrated) an operation of the first voltage generating device 24, an operation of the second voltage generating device 34 and the like are controlled.

Here, an explanation will be made of some of the sensors. An engine rotational speed sensor 154 for detecting an engine rotational speed is provided. An engine load sensor 156 for detecting an engine load is provided. It should be noted that a throttle opening sensor, an accelerator positioning sensor, an airflow meter, an intake pressure sensor and the like can be used as the engine load sensor 156.

In the engine 150, during a period from start to stop of the engine 150, in principle a voltage continues to be constantly applied to the discharge electrode 20 in the flow generating device 16. This voltage application is performed by control of the first voltage generating device 24 by a control unit 152a of the control device 152. Thereby the PM in the exhaust can be directed to the inner surface side of the exhaust tube 12 to reach the space 40s in the treatment device 18 as described above.

On the other hand, an oxidation device (including an oxidation catalyst) 160 is arranged in the downstream side of the exhaust purifying apparatus 110. The oxidation device 1160 can oxidize and burn the PM when a temperature of the exhaust is a predetermined temperature or more. Therefore when an operating condition detected based upon each output of the engine rotational speed sensor 154 and the engine load sensor 156 is in a state where exhaust in a high temperature is possibly generated, the control unit 152a of the control device 152 stops the voltage application to the discharge electrode 20, but may not stop it. It should be noted that in a predetermined operating condition, the control unit 152a may stop the voltage application to the discharge electrode 20. For example, when a fuel cut state lasts over a predetermined time, the voltage application to the discharge electrode 20 may stop.

Figure 8:
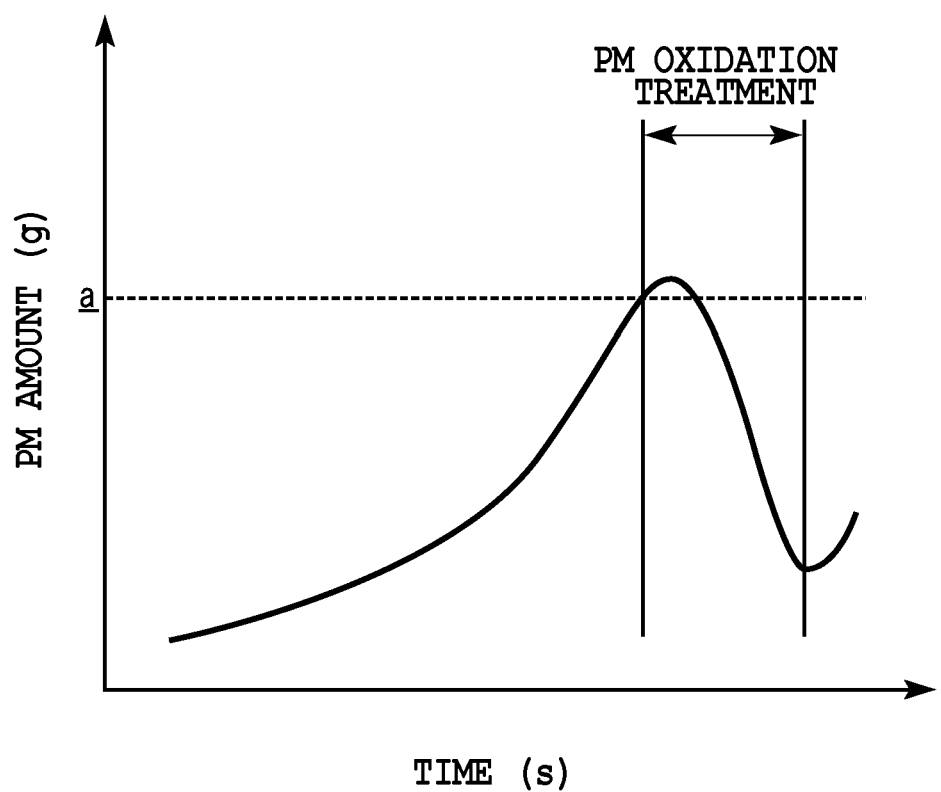
FIG. 8 is a graph conceptually illustrating a change in PM amount.

The treatment device 18 operates to oxidize PM when the PM amount exceeds a predetermined amount a. It should be noted that the PM amount herein corresponds to the amount of the PM collected inside of the exhaust tube 12 (including the space 40s) by an action of the flow generating device 16. As conceptually illustrated in FIG. 8, the PM amount normally increases with an elapse of time. In addition, when the PM amount to be estimated exceeds the predetermined amount a, the control unit 152b of the control device 152 operates the second voltage generating device 34 to apply a voltage to the center electrode 30d of the discharge member 30. Thereby it is possible to oxidize the PM. In FIG. 8, an increase/decrease of the PM amount by the PM oxidation treatment is expressed.

Figure 9:
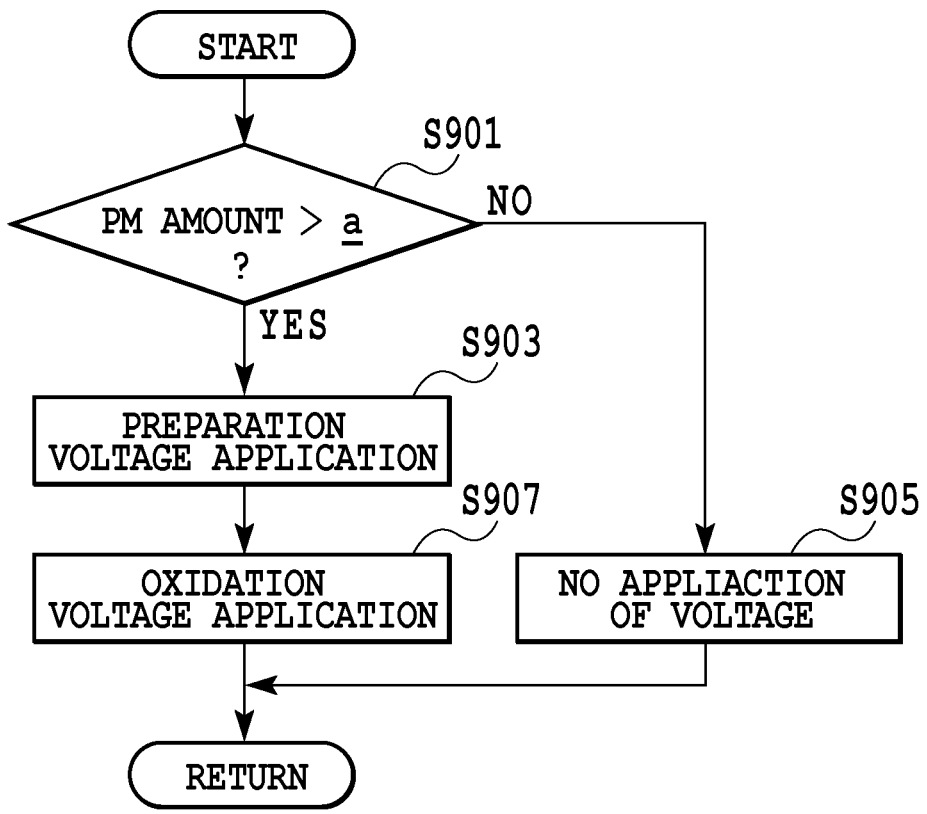
FIG. 9 is a flow chart illustrating voltage application control for a treatment device according to the second embodiment.

An explanation will be further made of the PM oxidation treatment based upon FIG. 9.

Figure 10:
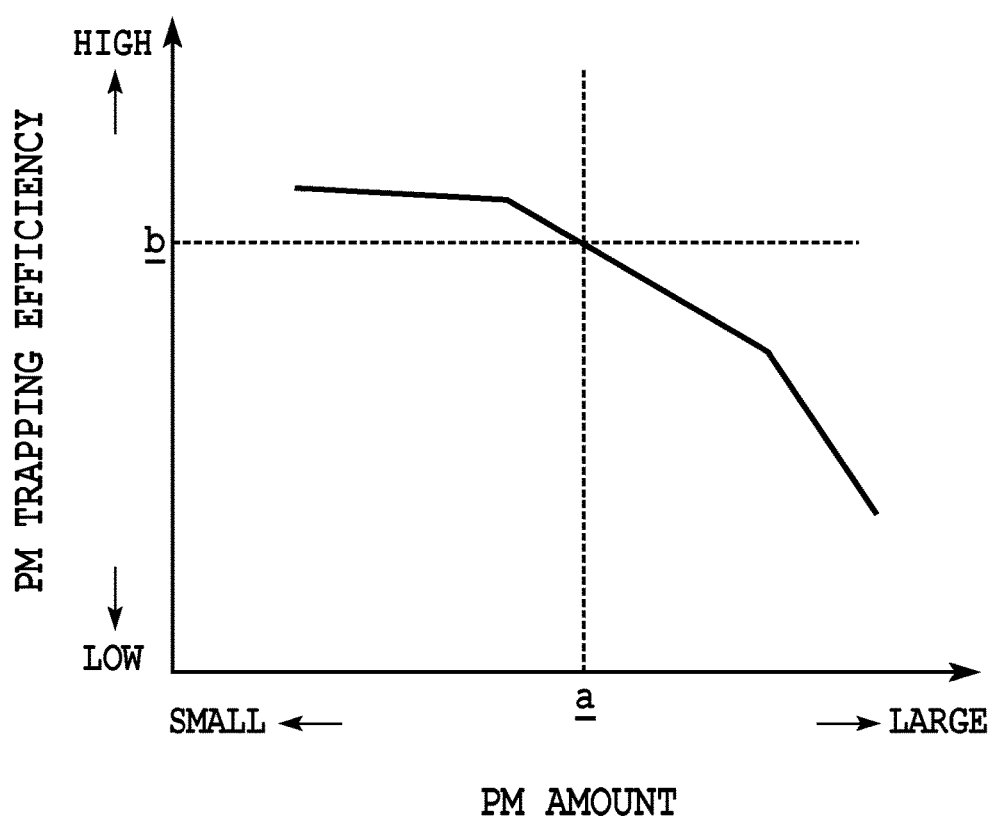
FIG. 10 is a graph illustrating a relationship between PM trapping efficiency and PM amount.

In step S901 it is determined whether or not the PM amount (integrated amount) exceeds a predetermined amount a. The PM amount is estimated (detected) based upon the history of operating conditions detected based upon output of each of the engine rotational speed sensor 154 and the engine load sensor 156. This estimation is executed by a section corresponding to an estimation portion of the control unit 152b in the control device 152. The control unit 152b estimates the PM deposit amount based upon the inclination as illustrated in FIG. 8. More specifically the control unit 152b has data or a calculation formula indicating the inclination as illustrated in FIG. 8, and can estimate the PM deposit amount based upon at least one thereof and the output of each of the engine rotational speed sensor 154 and the engine load sensor 156. Further, the PM deposit amount is estimated in consideration of a reduction in PM amount due to voltage application in step S907 to be described later. In addition, the predetermined amount a is defined from a relation between PM amount and PM trapping efficiency as conceptually illustrated in FIG. 10. The relation between PM amount and PM trapping efficiency is preliminarily defined based upon experiments, and in general, the PM trapping efficiency reduces according to an increase in PM amount. It should be noted that when the PM trapping efficiency is high, the action of the flow generating device 16 enables the PM to appropriately reach the inner surface of the exhaust tube 12 or the space 40*s*. The predetermined amount a is defined by a relation to a predetermined efficiency b such that the PM trapping efficiency by the flow generating device 16 is not below the predetermined efficiency b. It should be noted that the PM deposit amount may be estimated by the other method. When in step S901 a positive determination is made since the PM amount exceeds a predetermined amount a, the process goes to step S903. On the other hand, when in step S901 a negative determination is made, the process goes to step S905, wherein the voltage application for PM oxidation in the treatment device 18 is not performed.

In step S903 a preliminary preparation before oxidation treatment of PM is performed. In this preliminary preparation, a voltage (second voltage) lower than a voltage (first voltage) to be applied in the treatment device 18 in next step S907 is applied in the treatment device 18. For example, an AC voltage of 7 kV is applied in the treatment device 18. The voltage application in the treatment device 18 is performed for a predetermined time. The predetermined time may vary or be fixed. Here, the predetermined time is defined based upon experiments and is fixed.

Figure 11A:
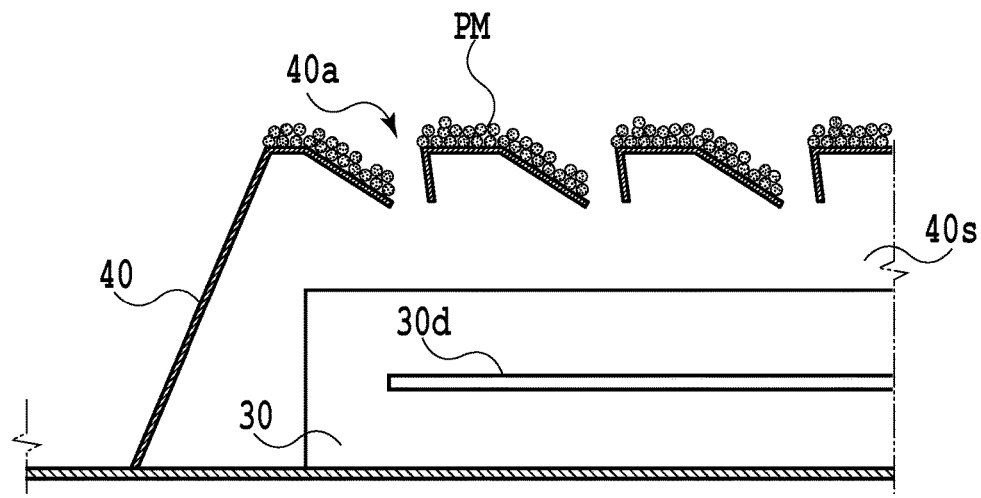
FIG. 11A is a diagram explaining pull-in of PM into a treatment space by voltage application in the treatment device according to the second embodiment.
Figure 11B:
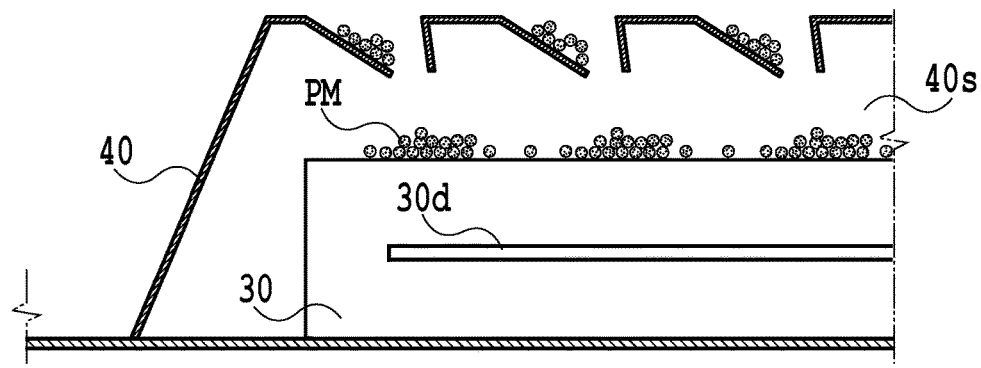
FIG. 11B is a diagram explaining pull-in of PM into a treatment space by voltage application in the treatment device according to the second embodiment.

An explanation will be made of the preliminary preparation in step S903 with reference to FIGS. 11A and 11B. FIG. 11A schematically illustrates a state where PM is deposited on the surface (surface in the discharge electrode 20-side) of the space defining member 40 by the action of the flow generating device 16 (it should be noted that the PM already remaining in the space 40*s* is omitted in illustration). The PM can be charged to be negative by the action of the flow generating device 16, but the space defining member 40 is conductive, and is connected to the exhaust tube 12 earthed, thus eliminating the charging state of the space defining member 40. In this state, when a second voltage is applied to the center electrode 30*d* of the discharge member 30, a region having an intensified electrical field is generated in the circumference of the discharge member 30, and the PM on the surface of the space defining member 40 is subjected to a gradient force toward the space 40*s*. As a result, as schematically illustrated in FIG. 11B, the PM on the surface of the space defining member 40 can reach the space 40*s*.

An explanation will be further made of a pull-in action of PM as an example. The deposited PM is pulled in a direction higher in electrical filed intensity by the gradient force. Upon applying a voltage to the discharge electrode 20, the electrical field intensity (E1) is formed on the surface of the space defining member 40. Corona discharge is generated by this voltage application, and the PM is charged and adheres on the surface of the space defining member 40 by an electrostatic force. Next, when an alternation voltage is applied to the center electrode 30*d* of the discharge member 30, an electrical field E2 is formed in the space 40*s* between the space defining member 40 and the discharge member 30. When E2 is larger than E1, the deposited PM is pulled into the space 40*s* by the gradient force.

It should be noted that the space defining member 40 is positioned at a distance in which the gradient force of the PM is appropriately generated, and the voltage application in the treatment device 18 is performed such that the gradient force of the PM is appropriately generated. FIG. 11B illustrates a state in the middle of the preliminary preparation in step S903.

In next step S907, the voltage application for PM oxidation in the treatment device 18, that is, application of the first voltage is performed. Thereby it is possible to treat the deposited PM. The voltage application is performed by a section corresponding to a performance portion of the control unit 1521*b* in the control device 512. In the present embodiment, when the PM amount exceeds the predetermined amount a in this manner, the treatment of the PM in the space 40*s* is executed after prompting inflow of the PM into the space 40*s*. As a result, the PM can be treated in the exhaust tube 12 more effectively. The voltage application in the treatment device 18 in step S907 is performed for a predetermined time. This predetermined time may be variable or fixed. Herein, the predetermined time in step S907 is defined based upon experiments, and is fixed.

It should be noted that this treatment of the PM is preferably executed when an engine operating condition is in a low load range. This is because when the engine operating condition is in the low load range, the discharge function (plasma generation or the like) is likely to be easily generated by the voltage application to the center electrode 30*d* of the discharge member 30. In addition, this treatment of the PM is preferably executed in the engine operating condition on which nitrogen components ($N_2$) in the exhaust are relatively small. This is because as the nitrogen components ($N_2$) in the exhaust are relatively larger, the discharge function is less likely to be generated by the voltage application to the discharge member 30.

Next, an explanation will be made of a third embodiment of the present invention. An exhaust purifying apparatus 210 according to the third embodiment is applied to an internal combustion engine as similar to the exhaust purifying apparatus 110 according to the second embodiment. The exhaust purifying apparatus 210 further includes an outflow restraining member for restraining the outflow of PM outside of the space 40*s* in addition to the configuration of the exhaust purifying apparatus 110 according to the second embodiment. Hereinafter, an explanation will be made primarily of different points in the third embodiment from the second embodiment, and components identical (equivalent) to those already explained are referred to as reference signs already used, and the further detailed explanation is omitted.

Figure 12A:
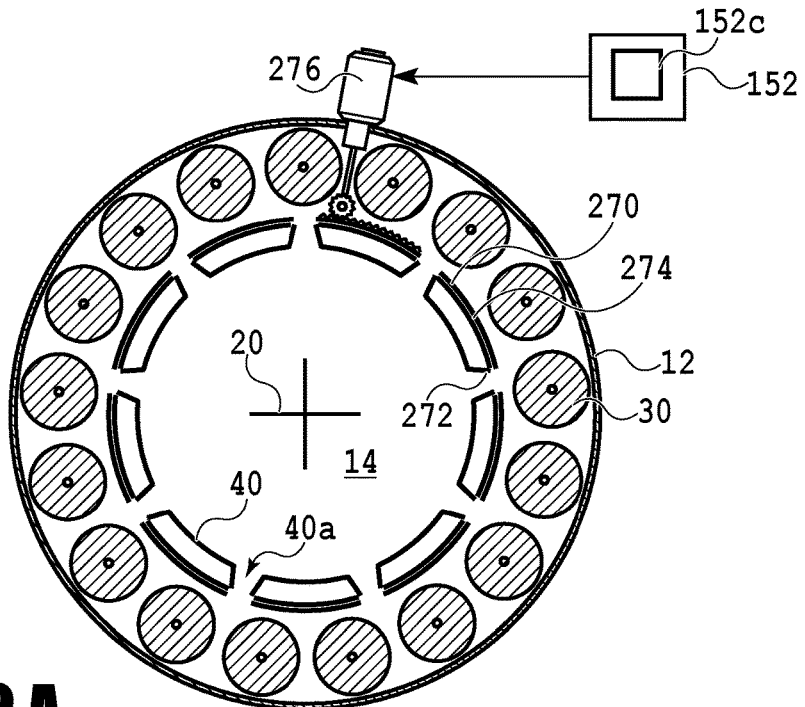
Figure 12B:
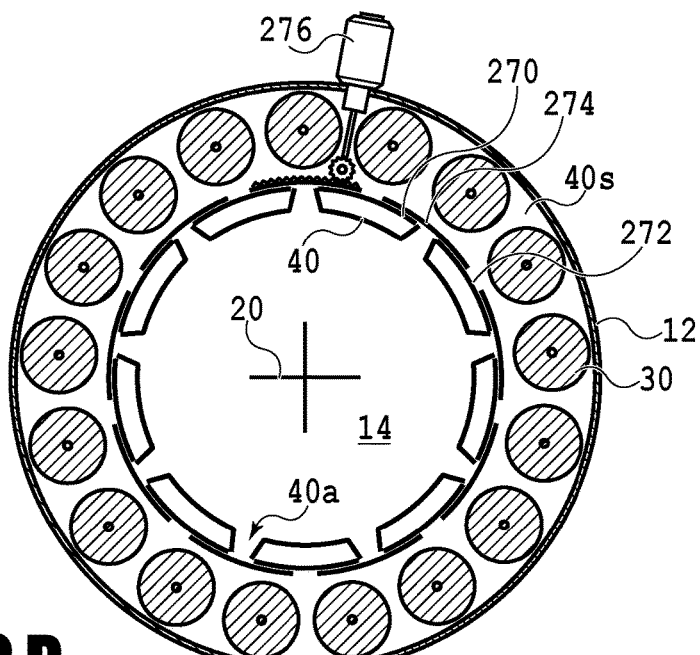

FIGS. 12A and 12B illustrate sectional schematic diagrams of the exhaust purifying apparatus 210. Each of FIGS. 12A and 12B is a cross section on a plane perpendicular to the longitudinal direction of the exhaust passage 14, and corresponds to the cross section in FIG. 2 of the exhaust purifying apparatus 10 according to the first embodiment. As illustrated in FIGS. 12A and 12B, an outflow restraining member 270 is disposed radially outside of the space defining member 40 and radially inside of the region where the discharge member 30 is arranged. The outflow restraining member 270 is provided with a base member 272 and a movable member 274 movable to the base member 272. The movable member 274 can move in the circumferential direction around the axis of the exhaust passage 14 due to an operation of an actuator 276 by a control unit 152*c* in the control device 152 (illustrated only in FIG. 12A). The actuator 276 is a motor, and a rotational force of the actuator 276 is transmitted to a rack through a gear (pinion) thereby to move the movable member 274 connected to the rack. FIG. 12A indicates an opening state where the movable member 274 is opening the plurality of holes 40a of the space defining member 40. FIG. 12B indicates a closing state where the movable member 274 is closing the plurality of holes 40a. The movable member 274 is selectively movable in a two-way direction between the opening state in FIG. 12A and the closing state in FIG. 12B, and can be positioned in the opening state and in the closing state. It should be noted that various link mechanisms may be adopted for moving the movable member 274 in relation to the base member 272.

Figure 13:
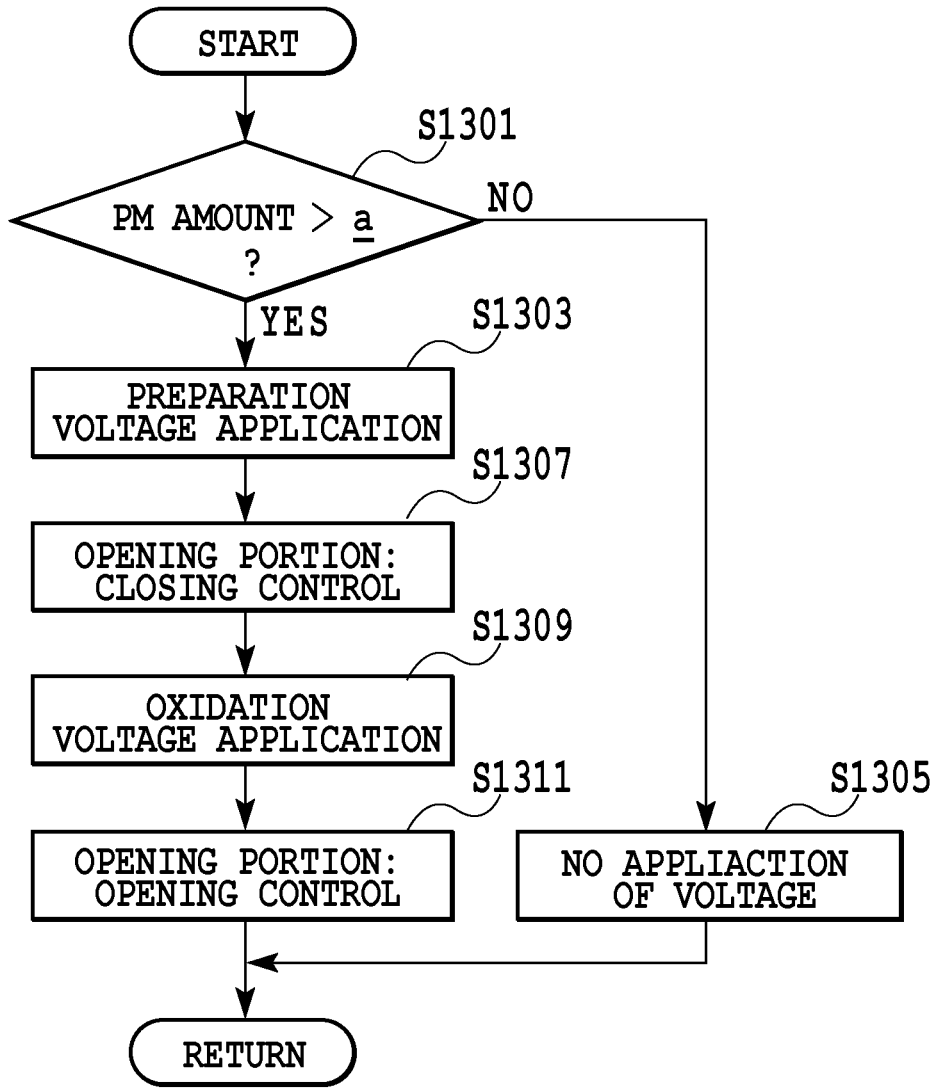
FIG. 13 is a flow chart illustrating voltage application control for a treatment device according to the third embodiment.

An explanation will be made of the movable control of the outflow restraining member 270 with reference to FIG. 13. It should be noted that steps S1301, S1303, S1305 and S1311 correspond to steps S901 to S907 respectively. Accordingly the explanation of the details in regard to steps S1301, S1303, S1305 and S1311 is omitted.

In step S1301 it is determined whether or not the PM amount exceeds the predetermined amount a. When a positive determination is made in step S1301 since the PM amount exceeds the predetermined amount a, the process goes to step S1303, wherein a second voltage is applied to the treatment device 18. When a negative determination is made in step S1301 since the PM amount does not exceed the predetermined amount a, the process goes to step S1305, wherein the voltage application is not performed in the treatment device 18.

After in step S1303 the voltage application is performed in the treatment device 18, in step S1307 the movable member 274 of the outflow restraining member 270 is moved to close the opening portion of the hole 40a. In addition, in step S1309 the voltage application is performed in the treatment device 18. Thereby the oxidation treatment of the PM is executed. At the oxidation treatment time of the PM, since the opening portion of the hole 40a is closed, for example even if the PM flies up in the space 40s, it is possible to prevent the PM from flowing out into the exhaust passage 14 through the holes 40a. Therefore the PM can be treated more appropriately.

In addition, after the process in step S1309 (after end of the voltage application), in step S1131 the movable member 274 of the outflow restraining member 270 is moved to open the opening portion of the hole 40a. Thereby this routine ends. The outflow restraining member 270 is in an opening state of opening the opening portion 40a at an initial state.

Figure 14A:
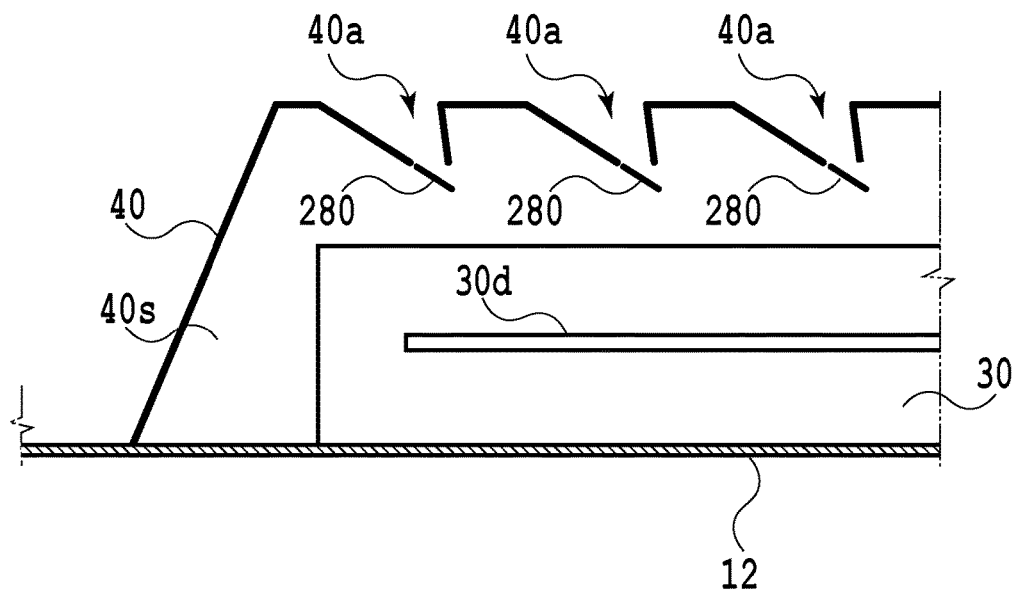
Figure 14B:
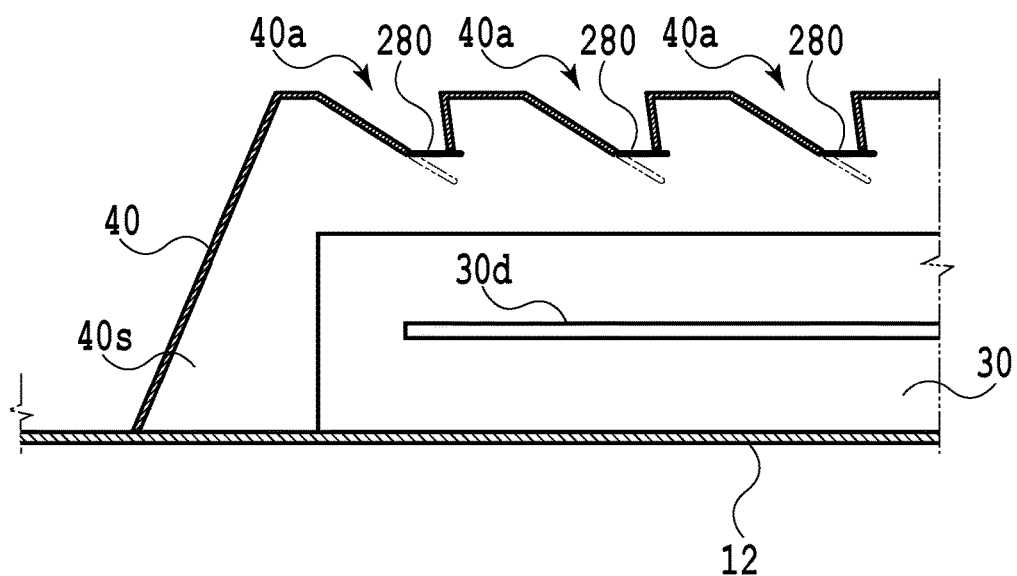

The movable member 274 of the outflow restraining member 270 may have the other configuration. For example, the outflow restraining member may be formed of a bimetallic member 280. In this case, the bimetallic member 280 is preferably designed to be disposed in each of the holes 40a in the space defining member 40, and to close the hole 40a at the engine stop time (that is, when a temperature of the exhaust passage 14 is lower than a predetermined temperature) (refer to FIG. 14B) and to open the hole 40a during the engine operating time (refer to FIG. 14A). Accordingly in this case the process for prompting the inflow of the PM into the space 40s (step S1303) and the oxidation treatment of the PM (step S1309) are preferably executed at the engine stop time (including an idling time). Alternatively a member including a magnetic material (capable of generating the magnetostrictive effect) may be arranged in the circumference of the opening portion 40a of the outflow restraining member 270. This magnetostrictive effect can create a substantially closing state of the hole 40a (where PM cannot go in or come out of the space 40s) and a substantially opening state of the hole 40a (where PM can go in or come out of the space 40s).

As described above, the embodiments of the present invention are explained, but the present invention may have the further other embodiments. For example, any combination of each embodiment and each configuration as described above is possible unless contradictory with each other. Further, the above discharge member 30 is substantially circular in section, but may be formed in a planar shape. For example, the first electrode may be arranged in the space 40s, the second electrode paired with the first electrode is arranged outside of the space 40s through the dielectric body in a flat plate shape, and the voltage application may be performed to the first electrode and the second electrode. In this manner, the present invention allows various configurations capable of treating PM by the discharge action in the space 40s between the space defining member 40 and the outer shell 12. It should be noted that the treatment device 18 may actively generate the plasma in the space 40s by the voltage application. In this case, the substantially entire region of the space 40s can be preferably in a plasma state by the action of the treatment device 18. For example, an electrode as the discharge electrode 20 is arranged in the space 40s, and applying a voltage to this electrode enables plasma to be generated in the space 40s to treat PM. In this case, it is possible to treat not only the PM trapped in the fibrous body 30f, but also the PM entering the space 40s and floating in the space 40s or the PM flowing out of the fibrous body 30f and floating in the space 40s.

Embodiments of the present invention include all modifications and applications, and its equivalents contained in the subject of the present invention defined by its claims. Therefore the present invention should not be interpreted in a limiting manner, and may be applied to any other techniques within the scope of the subject of the present invention.

What is claimed is:

1. An exhaust purifying apparatus comprising:
    a flow generating device that includes a discharge electrode arranged inside of a tubular outer shell forming a flow passage in which exhaust containing particulate matter flows and is configured to generate flow of the particulate matter from the discharge electrode side to the outer shell side with voltage application to the discharge electrode; and
    a treatment device that includes a space defining member that is arranged between said discharge electrode and said outer shell to define a treatment space between said outer shell and said space defining member and is configured to allow inflow of the particulate matter into the treatment space, and a treatment electrode arranged in the treatment space, wherein voltage application is performed to the treatment electrode upon treating the particulate matter.

2. The exhaust purifying apparatus according to claim 1, wherein
    at least a part of said outer shell and said space defining member is conductive, and
    said flow generating device is configured to generate a potential difference between said discharge electrode and at least one of said outer shell and said space defining member by the voltage application.

3. The exhaust purifying apparatus according to claim 1, wherein
    at least a part of said outer shell is conductive, and said treatment device is configured to generate a potential difference between said treatment electrode and said outer shell by the voltage application.

4. The exhaust purifying apparatus according to claim 1, wherein
said treatment device performs the voltage application of a first voltage upon prompting the inflow of the particulate matter into said treatment space, and performs the voltage application of a second voltage higher than said first voltage upon treating the particulate matter.

5. The exhaust purifying apparatus according to claim 1, wherein
said space defining member is provided to close a gap between said outer shell and said space defining member at an upstream end thereof in a flow direction of the exhaust, and includes a plurality of holes, each of the holes communicating said flow passage with said treatment space.

6. The exhaust purifying apparatus according to claim 1, wherein
said space defining member includes a plurality of holes, each of the holes communicating said flow passage with said treatment space, wherein an opening cross-section area of the hole closer to the discharge electrode is larger than an opening cross-section area of the hole closer to the outer shell.

7. The exhaust purifying apparatus according to claim 1, further comprising:
a cooling device that is configured to cool said treatment space.

8. The exhaust purifying apparatus according to claim 1, wherein said treatment device further includes an outflow restraining member for restraining the particulate matter from flowing out outside of said treatment space upon treating the particulate matter.

9. The exhaust purifying apparatus according to claim 8, wherein
said space defining member includes a plurality of holes, each of the holes communicating said flow passage with the treatment space, and
said outflow restraining member has selectively an opening state of opening the plurality of holes and a closing state of closing the plurality of holes in said space defining member.

10. The exhaust purifying apparatus according to claim 1, wherein
said treatment device can generate plasma in said treatment space by the voltage application, and an approximately entire region of said treatment space can be in a plasma state with an action of said treatment device.

11. An exhaust purifying apparatus comprising:
a tubular outer shell forming a flow passage in which exhaust containing particulate matter flows,
a discharge electrode arranged inside of the tubular outer shell,
a space defining member that is arranged between said discharge electrode and said outer shell to define a treatment space between the outer shell and the space defining member,
a treatment electrode arranged in the treatment space,
a first voltage generating device for applying a first voltage between said discharge electrode and at least one of said outer shell and said space defining member, and
a second voltage generating device for applying a second voltage between said treatment electrode and said outer shell.

12. The exhaust purifying apparatus according to claim 11, wherein said first voltage is lower than said second voltage.

13. The exhaust purifying apparatus according to claim 11, wherein said space defining member is provided to close a gap between said outer shell and said space defining member at an upstream end thereof in a flow direction of the exhaust, and includes a plurality of holes, each of the holes communicating said flow passage with said treatment space.

14. The exhaust purifying apparatus according to claim 13, wherein an opening cross-section area of the hole closer to said discharge electrode is larger than an opening cross-section area of the hole closer to said outer shell.

15. The exhaust purifying apparatus according to claim 13, wherein said space defining member further includes an outflow restraining member for restraining the particulate matter from flowing out outside of the treatment space through said plurality of holes.

16. The exhaust purifying apparatus according to claim 15, wherein said outflow restraining member has selectively an opening state of opening the plurality of holes and a closing state of closing the plurality of holes in said space defining member.

17. The exhaust purifying apparatus according to claim 11, wherein said treatment electrode comprises a center electrode covered by a dielectric body which is substantially circular in section.

18. The exhaust purifying apparatus according to claim 17, wherein said dielectric body includes a fibrous body mounted to the outer surface thereof.

* * * * *